(12) United States Patent
Shu et al.

(10) Patent No.: US 7,872,827 B2
(45) Date of Patent: Jan. 18, 2011

(54) IMPACT PROTECTION FOR A RETRACTABLE CONTROL OBJECT

(75) Inventors: JiaHong Shu, Singapore (SG); TzeMing Jimmy Pang, Singapore (SG); WeiSung Lee, Singapore (SG); KianKeong Ooi, Singapore (SG); KianSoon Yeo, Singapore (SG); Xiong Liu, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 633 days.

(21) Appl. No.: 11/829,723

(22) Filed: Jul. 27, 2007

(65) Prior Publication Data

US 2009/0027798 A1 Jan. 29, 2009

(51) Int. Cl.
*G11B 21/02* (2006.01)

(52) U.S. Cl. ............ 360/75; 360/77.02; 360/78.04

(58) Field of Classification Search ............ None
See application file for complete search history.

(56) References Cited

U.S. PATENT DOCUMENTS

| | | | |
|---|---|---|---|
| 4,862,298 A | 8/1989 | Genheimer et al. | |
| 4,897,743 A | 1/1990 | Kohno | |
| 5,004,207 A | 4/1991 | Ishikawa et al. | |
| 5,126,859 A | 6/1992 | Yoshinouchi et al. | |
| 5,227,929 A | 7/1993 | Comerford | |
| 5,235,472 A | 8/1993 | Smith | |
| 5,491,394 A | 2/1996 | Harwood et al. | |
| RE35,269 E | 6/1996 | Comerford | |
| 5,729,397 A | 3/1998 | Ottesen et al. | |
| 6,018,431 A * | 1/2000 | Carlson et al. | 360/60 |
| 6,088,185 A | 7/2000 | Ratliff et al. | |
| 6,101,067 A | 8/2000 | Matsuzono et al. | |
| 6,108,157 A * | 8/2000 | Yoneda et al. | 360/75 |
| 6,738,214 B2 * | 5/2004 | Ishiyama et al. | 360/75 |
| 6,965,487 B2 * | 11/2005 | Hanada et al. | 360/69 |
| 6,967,804 B1 | 11/2005 | Codilian | |
| 7,042,663 B2 | 5/2006 | Shimotono et al. | |
| 7,064,917 B2 * | 6/2006 | Shin | 360/75 |
| 7,177,113 B1 | 2/2007 | Semba et al. | |
| 7,191,089 B2 | 3/2007 | Clifford et al. | |
| 7,379,260 B2 * | 5/2008 | Aoki et al. | 360/75 |
| 7,382,566 B2 * | 6/2008 | Shimotono et al. | 360/75 |
| 7,428,119 B2 * | 9/2008 | Kuroki et al. | 360/75 |
| 7,430,088 B2 * | 9/2008 | Lee et al. | 360/73.03 |
| 7,436,616 B2 * | 10/2008 | Hansen et al. | 360/75 |
| 7,529,056 B2 * | 5/2009 | Aoki et al. | 360/75 |
| 7,660,066 B2 * | 2/2010 | Hara et al. | 360/75 |
| 2004/0240098 A1 * | 12/2004 | Ito et al. | 360/75 |
| 2007/0133119 A1 * | 6/2007 | Kim et al. | 360/75 |
| 2007/0297086 A1 * | 12/2007 | Lee et al. | 360/75 |

OTHER PUBLICATIONS

Galvin, Gregory J., Ph.D., President & CEO, Kionix, Inc., "Inertial Sensing for Hard disk Drive Drop Protection," INSIGHT, Online Journal of IDEMA, p. 1-7, (2Q, 2005).

* cited by examiner

*Primary Examiner*—Dismery E Mercedes
(74) *Attorney, Agent, or Firm*—Fellers, Snider, et al.

(57) ABSTRACT

Various embodiments of the present invention are generally directed to protecting a device from damage due to an impact event at the conclusion of a free fall condition through the use of a biasing signal that maintains a retention force until the impact event is completed.

20 Claims, 3 Drawing Sheets

IMPACT PROTECTION FOR A RETRACTABLE CONTROL OBJECT

BACKGROUND

This case is generally directed to active protection systems that protect a device from damage due to a free fall impact or similar acceleration condition.

Portable devices can often be dropped or otherwise subjected to excessive acceleration forces during operation and handling. For example, a portable electronic device such as a computer laptop, media player or digital/cell phone may be accidentally knocked off of a desk, dropped onto the floor, or even sent flying through the air at a time when the device is in use.

A variety of approaches have been proposed in the art in an effort to detect the application of such forces to a device, and to place the device in a protective mode to protect against damage as a result of a high force impact.

Some data storage devices include moveable transducers that fly adjacent rotatable media to carry out data read and write operations with the media. The devices can be configured to park the transducers in a safe location, such as on a load/unload ramp structure, when a free fall condition is detected. In this way, the transducers are not operationally adjacent the media surfaces when the device hits the ground.

While operable, with the continued consumer demand for various types of portable devices, there remains a continual need for improvements whereby a device can be operated in a variety of environments and yet protected against damage due to changes in acceleration state.

SUMMARY

Various embodiments of the present invention are generally directed to protecting a device from damage due to an impact event at the conclusion of a free fall condition through the use of a biasing signal that maintains a retention force until the impact event is completed.

In accordance with some embodiments, a method generally comprises applying a first bias signal to move a control object of a device to a parked position in response to a sensor input indicative of a free fall condition, and applying a second bias signal to maintain the control object in the parked position during subsequent occurrence of an impact event at the conclusion of the free fall condition.

In accordance with other embodiments, an apparatus generally comprises a controller which, responsive to a sensor input indicative of a free fall condition, operates to apply a first bias signal to move a control object of a device to a parked position, and to apply a second bias signal to maintain the control object in the parked position during occurrence of an impact event at the conclusion of the free fall condition.

In accordance with further embodiments, an apparatus generally comprises a free fall sensor which generates an acceleration output signal indicative of a free fall condition, and first means for applying a first bias signal to move a control object of a device to a parked position, and for applying a second bias signal to maintain the control object in the parked position during occurrence of an impact event at the conclusion of the free fall condition.

DETAILED DESCRIPTION

Figure 1:
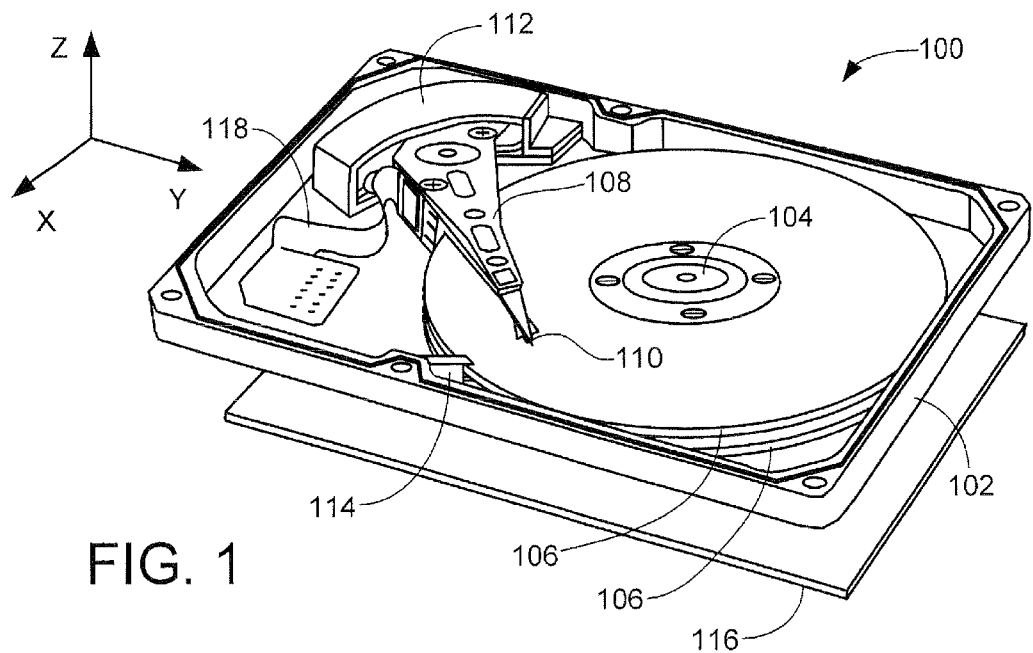
FIG. 1 shows an exemplary computer laptop with an integrated data storage device therein.

FIG. 1 provides an isometric view of a data storage device 100 to illustrate an exemplary environment in which various embodiments of the present invention can be advantageously practiced. The device 100 is preferably characterized as a hard disc drive, and includes a base deck 102 which mates with a top cover (not shown) to provide a sealed housing.

A spindle motor 104 rotates data storage media 106 at a constant high speed during device operation. A rotary actuator 108 supports a corresponding array of data transducers (read/write heads) 110 adjacent the media surfaces.

The actuator 108 moves the transducers 110 in response to control inputs supplied to a voice coil motor (VCM) 112. When the device 100 is deactivated, the transducers 110 are moved to a load/unload ramp structure 114. Control electronics for the device 100 are provided on an externally mounted disc drive printed circuit board (PCB) 116. Communication between the PCB 116 and the actuator and VCM 108, 112 is facilitated by a flex circuit assembly 118.

Figure 2:
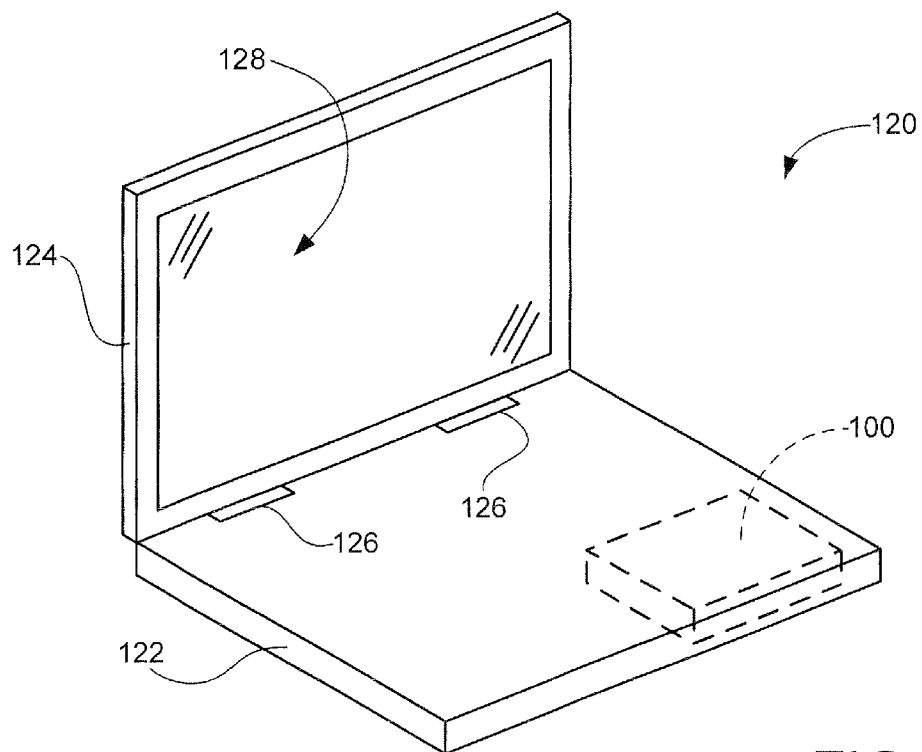
FIG. 2 provides an isometric, partially exploded view of the data storage device of FIG. 1.

FIG. 2 illustrates a computer laptop 120 in which the data storage device 100 is preferably disposed. The laptop 120 is contemplated as comprising a personal computer (PC) device that can transported and operated by the user in a number of locations.

The computer laptop 120, also referred to herein as a "host device," includes a base 122 with a keyboard and mouse input (not shown) accessible by the user. A cover 124 is hingedly affixed to the base 122 via hinges 126 so as to move between a closed position and an open position. The inside surface of the cover provides a view screen 128.

The base 122 includes a number of operational components including a power supply, a mother board with CPU, and peripheral devices to enable communication and data transfer with portable media and/or a network (also not shown). The data storage device 100 is preferably characterized as a 2.5 inch form factor hard disc drive, although such is not limiting.

It is contemplated that the data storage device 100 incorporates an active protection system to protect the device 100 from damage due to the application of acceleration and/or impact forces to the laptop 120, such as in a free fall event in which the laptop 120 is inadvertently dropped onto a base (e.g., floor) surface.

Figure 3:
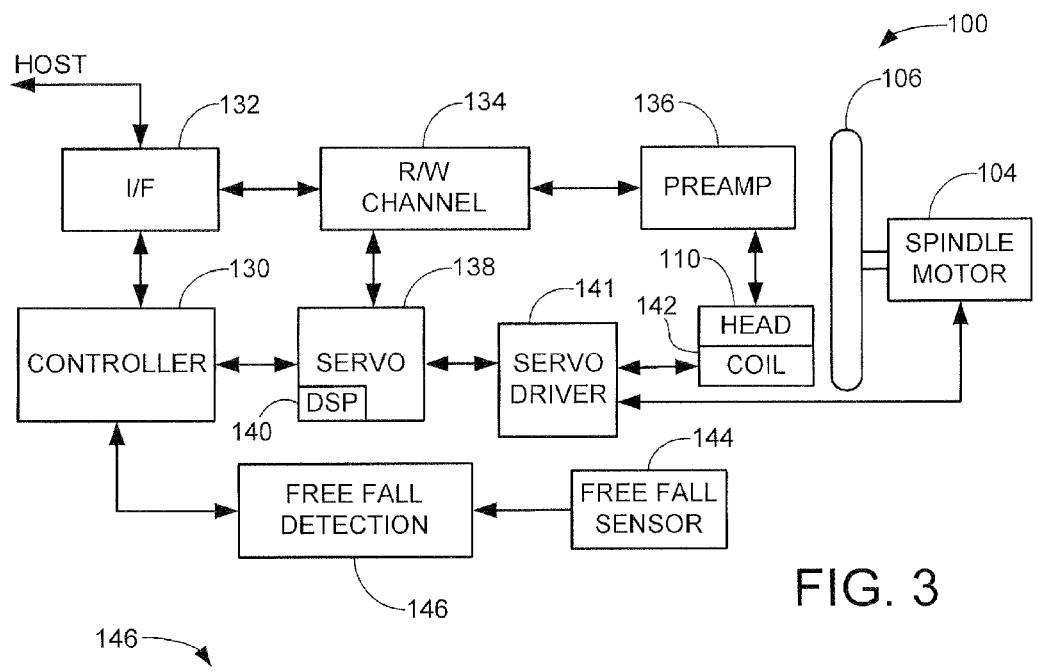
FIG. 3 sets forth a functional block diagram for the data storage device of FIG. 2.

A generalized functional block diagram for the device 100 is set forth in FIG. 3. Top level control for the device is supplied by a controller 130, preferably characterized as a programmable processor. Host I/O operations are coordinated with an interface (I/F) circuit 132.

Data supplied to the I/F circuit 132 for writing to the media 106 are encoded and serialized by a read/write (R/W) circuit 134. A preamplifier/driver (preamp) circuit 136 applies the appropriate write currents to the transducer 110 to write the encoded and serialized data. To read back data previously stored to the media, the transducer 110 transduces a readback signal that is preamplified by the preamp 136 and processed by the R/W circuit 134. The reconstructed data are thereafter transferred by the I/F circuit 132 to the host.

A closed loop servo control block 138 preferably includes a second processor (DSP 140). The servo control block 138 provides control signals to a servo driver 141, which in turn applies current to a coil 142 of the VCM 112 to move the transducers 110 as required, and controls the operation of the spindle motor 104.

A free fall sensor 144 is configured to provide acceleration state signals to a protection processing circuit 146. The sensor 144 preferably comprises a capacitance transducer which provides multi-axis acceleration outputs along three orthogonal axes x, y and z of the device 100, as shown in FIG. 1. Other constructions for the sensor can readily be used, however, including piezoelectric, etc.

Figure 4:
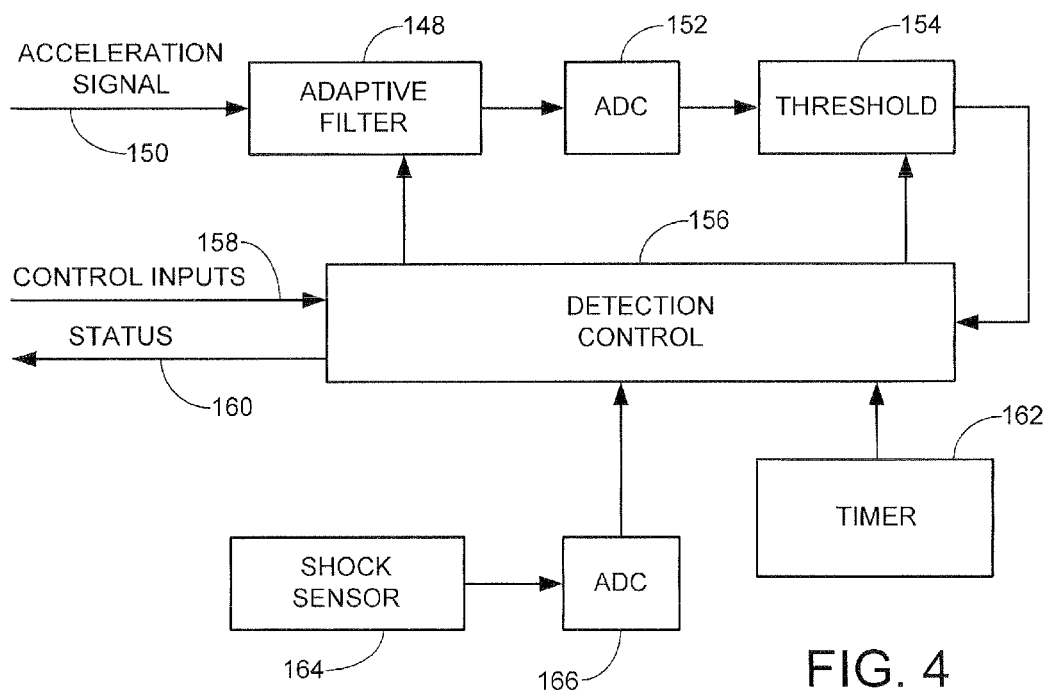
FIG. 4 sets forth various aspects of an active protection system of FIG. 3.

A preferred construction for the protection processing circuit 146 is set forth by FIG. 4. Acceleration signal(s) from the sensor 144 may be supplied to an adaptive filter block 148 via paths 150, and converted to digital form by an analog-to-digital (ADC) 152. A threshold value is applied to the digital output by threshold block 154.

The signal filtering process carried out by the adaptive filter 148, as well as the threshold values applied by the threshold block 184, may be selected by a detection control block 156 in response to control inputs provided via path 158. Generally, an imminent impact signature (i.e., a free fall condition) may be detected in relation to the digital output of the ADC 152 and the associated threshold applied by the threshold block 154.

A status output is preferably supplied on path 160 to notify the controller of a detected free fall condition, enabling the data storage device 100 to take steps to protect against being damaged by a subsequent impact event at the conclusion of the free fall condition. An optional timer 162 can also be used in the active protection system as explained below.

At least some of the components of FIG. 4 can be incorporated directly into the free fall sensor 144, so that the sensor 144 provides a digital directly to a port of the controller 130 to indicate the presence of a free fall condition (e.g., a logical "1" is supplied to indicate the occurrence of a free fall event, and a logical "0" is output at all other times, etc.).

A second sensor 164 is preferably used to detect mechanical shock events in terms of changes in acceleration (jerk). The shock sensor 164 preferably has a 3-axis piezo construction, although other configurations can alternatively be employed.

The shock sensor 164 provides analog acceleration signal(s) to a second ADC 166, which provides corresponding digital samples to the control block 156. Detection of a shock event of sufficient magnitude by the sensor 164 during a write operation preferably results in a write inhibit signal being supplied to the R/W channel 134, thereby interrupting the writing of data and avoiding the overwriting of data on adjacent tracks.

Figure 5:
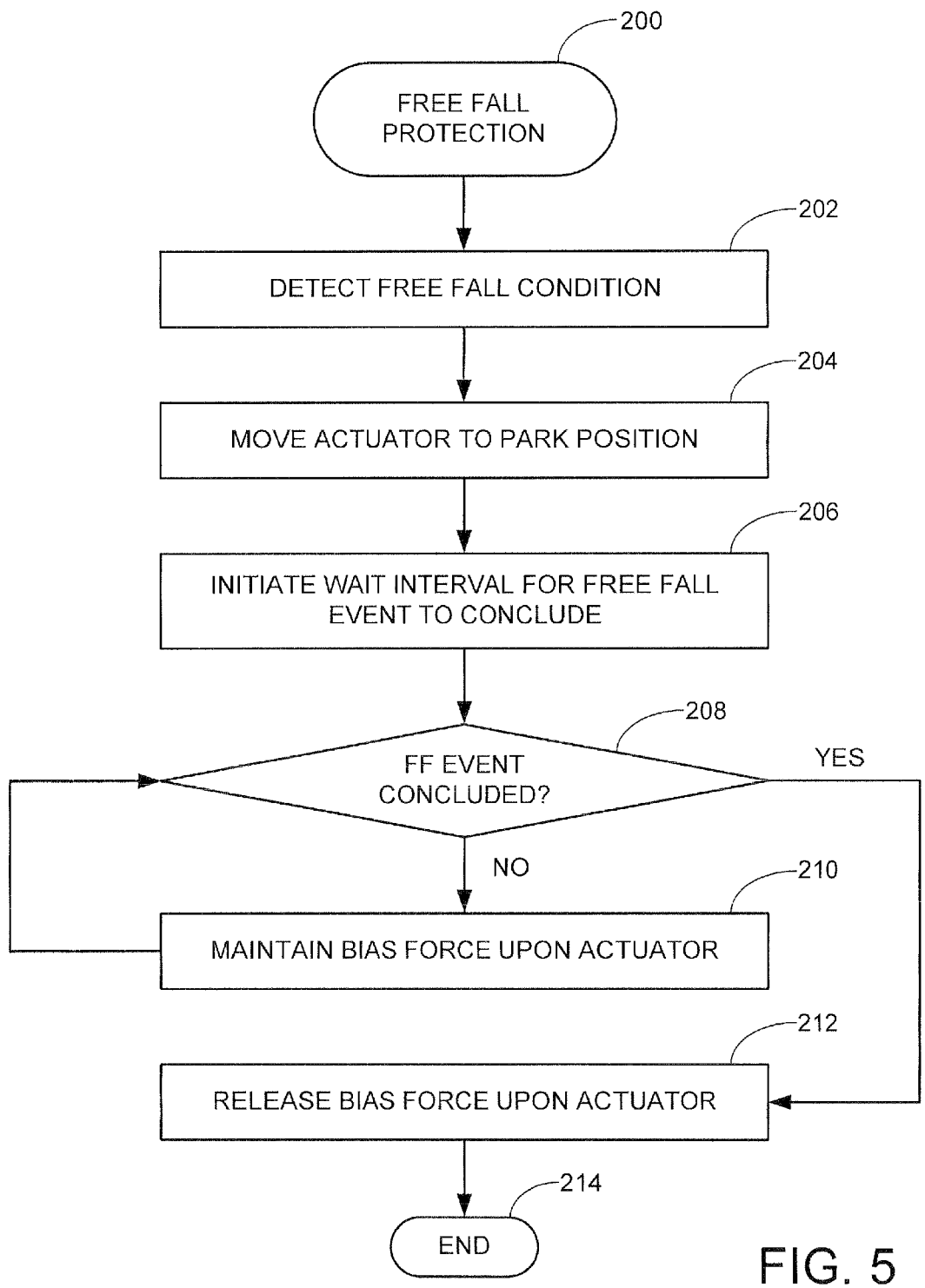
FIG. 5 provides a flow chart for a FREE FALL PROTECTION routine, generally illustrative of steps carried out in accordance with various embodiments of the present invention.

The active protection system of FIGS. 3-4 preferably operates to protect the device 100 from damage in accordance with a FREE FALL PROTECTION routine 200 of FIG. 5. It is contemplated that the routine 200 is enacted during normal operation of the device 100 when the media 106 are rotating at the specified velocity and the transducers 110 are loaded adjacent the media surfaces to carry out I/O operations.

At some point during such operation, it is contemplated that a free fall condition will be detected, as indicated by step 202 in FIG. 5. The free fall condition will be detected in relation to the detected output of the free fall sensor 144 (FIG. 4) indicating an anomalous acceleration condition is under-way. In some embodiments, the sensor 144 generates a composite acceleration signal in accordance with the following relationship:

$$a_T = \sqrt{(a_x^2 + a_y^2 + a_z^2)} \quad (1)$$

where $a_T$ is the composite acceleration value, and $a_X$, $a_Y$ and $a_Z$ are the respective acceleration components in the x, y and z directions. The free fall event can thus be declared in relation to the magnitude of the composite acceleration signal $a_T$.

For example, a sustained magnitude of the composite signal $a_T$ below a selected threshold, such as 0.5 g, may indicate that the laptop computer 120 is experiencing a free fall event without significant rotation (such as if the laptop slips straight off of a user's lap toward the floor). On the other hand, a sustained magnitude of the composite signal $a_T$ above a selected threshold, such as 1.5 g, may indicate that the laptop computer 120 is falling with significant rotation (such as if the laptop 120 "tumbles" as it falls along one or more rotational directions). Other free fall detection methodologies can readily be used as well, including methodologies that evaluate each of the separate xyz acceleration components individually.

Empirical analysis indicates that a free fall event of about 0.4 meters in standard Earth gravity may generally take about 285 milliseconds (ms) to complete before impact, and such impact may be as high as 300-400 g of force. Accordingly, it is contemplated that step 202 generally involves the detection of a magnitude of an acceleration signal being of sufficient magnitude, for a sufficient period of time, to correctly discern that a free fall event is underway. Such operation can readily be accomplished in a number of ways, such as by using a counter to accumulate a count of samples associated with the free fall sensor output.

The routine next passes to step 204, wherein the actuator 108 is quickly retracted to a parked position. This preferably involves the application of a suitable bias signal to the VCM 112 by the servo circuit 138 (FIG. 3) to move the transducers 110 onto the ramp structure 114 in a relatively short period of time. As desired, a braking operation may also be enacted by the servo circuit 138 during this step to quickly halt further rotation of the spindle motor 104, thereby bringing the spindle motor and the media 106 to rest. This latter step may reduce disc slippage as a result of high decelerating impact.

The biasing signal provided to the VCM 112 is preferably contemplated as comprising a retraction current of sufficient magnitude and polarity to quickly drive the transducers 110 to the parked position, and will preferably occur at a rate faster than a normal commanded parking operation due to the limited time available before impact. Preferably, a bias force is maintained upon the actuator 108 by way of the continued application of current to the VCM 112 even after the transducers 110 have reached the parked position. This current may be of the same, or different, magnitude as the retraction current, and is used to retain the actuator in the parked position upon impact.

A wait interval is next initiated at step 206 during which the active protection system waits for the free fall event to conclude. Decision step 208 inquires whether the event in fact has been terminated; if not, the bias force continues to be maintained upon the actuator 108, as shown by step 210.

The wait interval of step 206 can be determined in a number of ways. In some embodiments, the bias force is retained upon the actuator 108 until the shock sensor 164 reports a significant deceleration event, indicative of an impact (such as the laptop 120 hitting the floor or other underlying surface toward which it was falling). Since the shock sensor will preferably report the initial impact, as well as any subsequent impacts (such as by bouncing, etc.), the shock sensor can be reliably used as an indicator of when the wait interval can be adjudged as being safely concluded.

In other embodiments, a predetermined time interval can be initiated at step 206, such as by the timer 162 in FIG. 4, and the wait period can extend until this time interval lapses. This can be used in lieu of a shock sensor, or in addition to the reporting provided by the shock sensor as described above. For example, a drop of about 1.5 meters will generally take about 550 ms to complete, and may involve an impact of upwards of around 2800 g. Thus, a predetermined time interval above the highest likely drop distance (and subsequent bouncing, etc.) can alternatively be selected, such as on the order of 1-2 seconds, for the wait interval.

In yet other embodiments, the above techniques are combined; for example, the shock sensor 164 output is monitored to detect one or more impact events, signaling the end of the free fall condition (but not necessarily the end of any settling motion by the laptop). The timer 162 is concurrently initiated (such as at the commencement of the free fall condition) and a selected amount of time after a conclusion of the settling operation is permitted to elapse before the wait interval is deemed to have concluded.

Once the free fall event is determined to be over, as shown by FIG. 5 the flow passes to step 212 where the bias force is subsequently released from the actuator, and the routine ends at step 214.

The application of the bias force upon the actuator is contemplated as operating to compress the actuator against a compressive limit stop (not separately shown) in a direction away from the media surfaces. While a latch mechanism may be provided to exert a latching bias force to maintain the actuator in the parked position, the retention bias force applied by step 210 is preferably selected to be in the same direction of, and of greater magnitude than, the latching bias force, thereby further securing the actuator 112 against inadvertent movement of the transducers 112 out onto the media surfaces as a result of a significant impact event.

While the foregoing description is generally directed to the environment of a data storage device, it will be appreciated that the claimed invention is not so limited. Rather, any number of different types of devices with moveable control objects can be protected in accordance with the foregoing discussion.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular control environment without departing from the spirit and scope of the present invention.

What is claimed is:

1. A method comprising:
    applying a first bias signal to move a control object of a device to a parked position in response to a sensor input indicative of a free fall condition; and
    applying a second bias signal to maintain the control object in the parked position during subsequent occurrence of an impact event at the conclusion of the free fall condition.

2. The method of claim 1, further comprising identifying the free fall condition of the device in relation to an acceleration output signal from a free fall sensor.

3. The method of claim 1, wherein the applying a first bias signal step comprises applying a first current to a motor to retract the control object to the parked position, and wherein the applying a second bias signal step comprises applying a second current to the motor to impart a bias force upon the control object to thereby contactingly engage a limit stop.

4. The method of claim 1, wherein a latch mechanism retains the control object in the parked position with a first retention force, and the second bias signal retains the control object in the parked position with a second retention force greater than, and in the same direction as, the first retention force.

5. The method of claim 1, wherein the applying a second bias signal step comprises maintaining the application of the second bias signal until a shock sensor detects the impact event, after which the second bias signal is removed.

6. The method of claim 1, wherein the applying a second bias signal step comprises maintaining the application of the second bias signal over a predetermined time interval selected to extend beyond a time during which the impact event will have likely occurred, after which the second bias signal is removed.

7. The method of claim 1, further comprising a step of braking a motor to halt further rotation of a disc after the control object is moved to the parked position and prior to occurrence of the impact event, wherein the parked position is a position adjacent a radial extent of said disc.

8. The method of claim 1, wherein the control object comprises an actuator which supports a data transducer adjacent a rotatable data storage medium, wherein the data transducer is parked on a ramp structure adjacent an outermost diameter of the data storage medium, and wherein the first and second bias signals comprises respective first and second currents applied to a coil of a voice coil motor coupled to the actuator.

9. The method of claim 1, wherein the second bias signal continuously drives the control object in contacting engagement against a limit stop adjacent the parked position during and after said occurrence of the impact event.

10. The method of claim 9, wherein the second bias signal is removed responsive to a sensor input indicative of said occurrence of the impact event.

11. An apparatus comprising:
    a controller which, responsive to a sensor input indicative of a free fall condition, operates to apply a first bias signal to move a control object of a device to a parked position, and to apply a second bias signal to continuously drive the control object against a limit stop in the parked position during occurrence of an impact event at the conclusion of the free fall condition.

12. The apparatus of claim 11, in combination with a free fall sensor which generates an acceleration output signal indicative of said free fall condition.

13. The apparatus of claim 11, in combination with a motor, wherein the first bias signal comprises a first current applied to the motor to retract the control object to the parked position and the second bias signal comprises a second current applied to the motor to generate a bias force upon the control object to contactingly engage a limit stop adjacent the parked position, the first and second currents each operable to urge the control object in a common rotational direction.

14. The apparatus of claim 11, wherein the controller maintains the application of the second bias signal until a shock sensor detects the impact event, after which the second bias signal is removed.

15. The apparatus of claim 11, wherein the controller maintains the application of the second bias signal over a predetermined time interval selected to extend beyond a time during which the impact event will have likely occurred, after which the second bias signal is removed.

16. The apparatus of claim 11, in combination with a latch mechanism which captures the control object in the parked position with a first retention force, wherein the second bias signal applies a second retention force upon the control object greater than, and in the same direction as, the first retention force.

17. The apparatus of claim 11, wherein the controller further operates to brake a motor to halt further rotation of a disc after the control object is moved to the parked position and prior to occurrence of the impact event.

18. The apparatus of claim 11, wherein the control object comprises an actuator which supports a data transducer adjacent a rotatable data storage medium, wherein the data transducer is parked on a ramp structure adjacent an outermost diameter of the data storage medium, and wherein the first and second bias signals comprises respective first and second currents applied to a coil of a voice coil motor coupled to the actuator.

19. A method comprising:
latching a control object in a parked position responsive to a sensor input indicative of a free fall condition; and
applying a motor drive signal to bias the latched control object during subsequent occurrence of an impact event at the conclusion of the free fall condition.

20. The method of claim 9, wherein the control object is moved in a first direction to the parked position, and the motor drive signal biases the control object in said first direction against a compressive limit stop.

* * * * *